INVENTOR
ANDRE CHAUSSON
BY

United States Patent Office 2,899,125
Patented Aug. 11, 1959

2,899,125

ELECTROMAGNETICALLY MAINTAINED OSCILLATING MOVEMENT HERMETIC COMPRESSOR

André Chausson, Asnieres, France, assignor to Societe Anonyme des Usines Chausson, Asnieres, France, a company of France Original application March 23, 1956, Serial No. 573,550. Divided and this application June 21, 1957, Serial No. 667,152

Claims priority, application France March 25, 1955

3 Claims. (Cl. 230—55)

This invention relates to electro-magnetically controlled compressors in which the magnetically polarized armatures oscillate in an alternating field produced by coils fed with alternating current. The present application is a division of application Serial No. 573,550 filed March 23, 1956.

It relates more particularly to tuned frequency apparatuses in which the mobile units comprising the compressor members and polarized armatures are carried by resilient elements formed by spring plates whose resilient characteristics are determined so that the mobile units have their own vibration frequency that is slightly lower than the frequency of the exciter alternating current. These apparatuses have the advantage of being self-regulators, for, when the counter-pressure of the delivered fluid increases, as is the case in a refrigerator apparatus in which the pressure in the condenser increases with the surrounding temperature, the resilient forces applied to the mobile units also increase, which has the effect of causing the apparatus to operate nearer to resonance, and consequently, in output conditions which increase with the work to be accomplished.

Moreover, the utilizing of polarized armatures enables the number of cycles of the mobile units to be reduced by half, during the time period for an alternating current of given frequency, which is very important in a piston machine, as is the case of the device of the invention, for it becomes possible to obtain a satisfactory filling of the compression cavities, seeing that the input speed of the fluid to be compressed in the cylinders may be lower for a given amplitude of the stroke of the pistons.

The magnetic circuits of these apparatuses are so made that the electromotive power induced during the operating is great, so that the electromagnetic yield is as high as possible. Nevertheless, the composition of these magnetic circuits only allows the magnetic flux to be varied between two limits comprised between zero and plus $\phi$. This is due to the actual composition of these circuits and their co-operating armature.

This invention produces a new compressor in which the magnetic circuit is so formed that it becomes possible to vary the flux within limits that are appreciably very wide, which are comprised between minus $\phi$ and plus $\phi$, which makes it possible substantially to improve the power obtained by the apparatus without increasing its size.

It is especially possible, in an apparatus of the same power, to reduce by half the weight of the copper required for making the inductor windings.

Furthermore, the embodiment according to the invention affords the important advantage of making the coils and magnets always work, no matter what may be the position of the latter, in relation to the magnetic circuit, which is not the case in arrangements known up till now in which some of the magnets or some of the coils are not utilized during one alternation in two of the excitation alternating current.

According to the invention, the polarized armature tuned frequency electro-magnetic compressor, comprises a resilient vibrating support, two parallel permanent magnets carried by this resilient support, these magnets being placed in an air-gap delimited by two identical elements of a magnetic circuit, these elements each having three poles placed in relation to said magnets so that the latter are placed at rest between the poles of the said two elements of the magnetic circuit, said identical elements of the magnetic circuit each comprising at least one coil fed with alternating current whose branch is selected for determining at each alternation of the alternating feed current of these coils the polarities opposed to the poles opposite to the two said identical elements of the magnetic circuit.

Various other characteristics of the purpose of the invention will moreover be revealed in the detailed description which follows.

One form of embodiment of the compressor of the invention is shown, by way of non-restrictive examples in the attached drawings.

Figure 1:
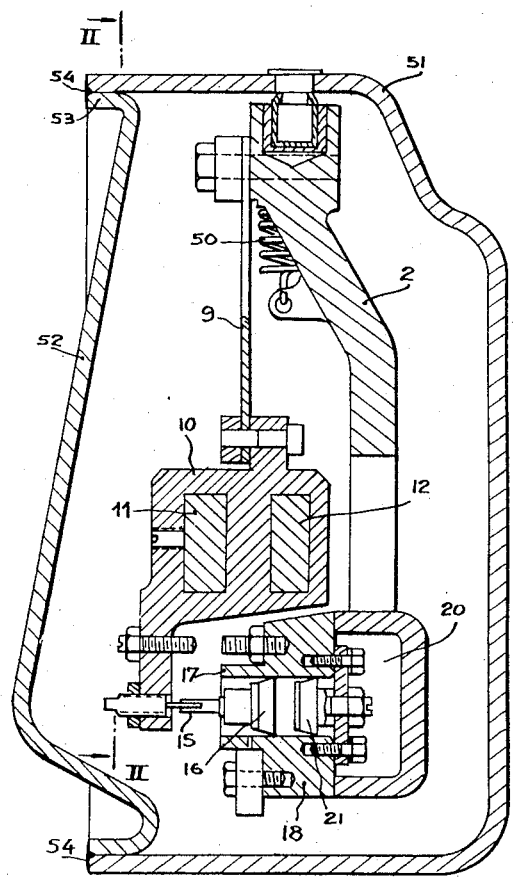
Fig. 1 is an elevation-section of a form of embodiment of the hermetic compressor according to this invention, this section being taken along the line I—I of Fig. 2.

The compressor shown in the drawings comprises a plate 2 serving as a bearing for a flexible plate 9. The flexible plate 9 comprises, at its free end, a part 10 made of a magnetic metal but conductive of electricity, serving for embedding the permanent magnets 11, 12.

The part 10 also serves to operate a flexible rod 15, at the end of which a piston 16 is mounted designed to slide in a cylinder 17 fixed to the plate 2 by a casing 18.

21 designates a valve provided in the same manner as the piston 16 with a distortable resilient packing, this valve insulating the inside of the cylinder 17 from a chamber 20 in which the fluid is repulsed by the piston 16 when the compressor is working, this fluid being then directed towards the refrigerating apparatus for example.

The compressor unit is resiliently suspended by means of springs 50 inside a tank 51 which is traversed by the various input and output ducts for the liquid and which is closed by a cover 52 whose shape is chosen so that its bent-back marginal edge 53 penetrates inside the tank 51 to which it is then welded at 54, thus ensuring absolute fluid-tightness for the bell thus constructed.

Figure 3:
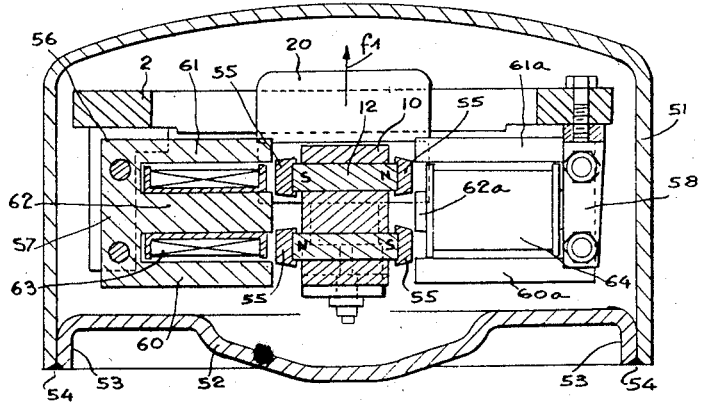
Fig. 3 is a section taken along the line III—III of Fig. 2.

The permanent magnets 11 and 12, whose polarities are opposed, as can be more particularly seen in Fig. 3, are provided at their ends, which project on either side of the support part 10 which envelops them, with polar parts 55, made of soft iron, for example.

Figure 2:
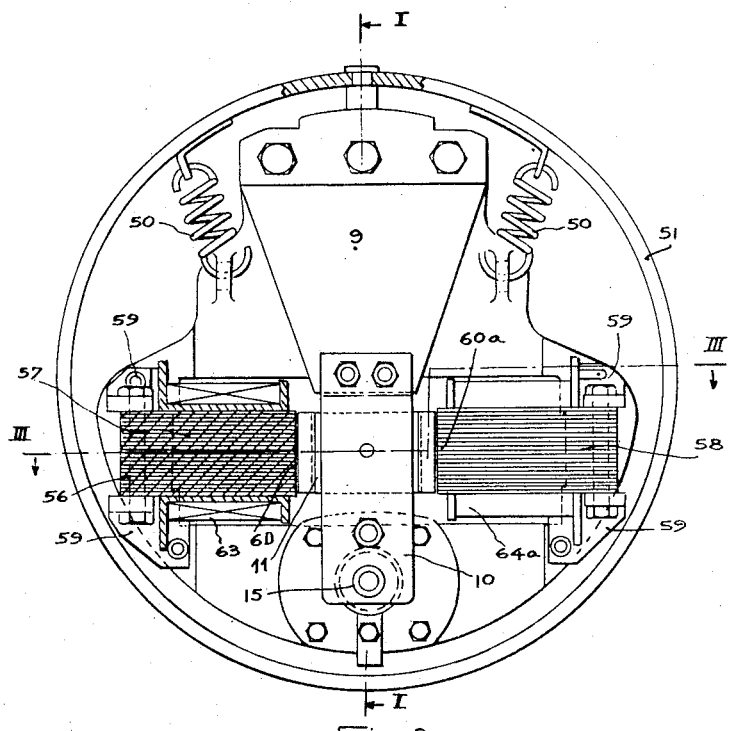
Fig. 2 is a section, on a smaller scale, taken along the line II—II of Fig. 1.

The magnets 11 and 12 are intended to be moved in an alternating manner in the air-gap of a magnetic circuit 56 which comprises two identical elements 57, 58, made by means of magnetic steel sheets piled one on the other and fixed by any suitable means to the plate 2, which comprises, or forms, lugs 59, to this end (Fig. 2).

In certain cases, it is advantageous, to avoid magnetic losses, that the elements 57, 58 be magnetically insulated from the plate 2.

Each of the elements of the magnetic circuit has two lateral poles 60, 61—60a, 61a (Fig. 3) and a median pole 62, 62a. The width of the median poles, 62, 62a is selected so that it is substantially equal to the space separating the two permanent magnets 11, 12, whose width, or at least that of the polar parts 55, is so calculated that these magnets intercept both the median poles 62, 62a and respectively the lateral poles 60, 60a and 61, 61a.

The width of the lateral poles 60, 61 and 60a, 61a is less than that of the median poles 62, 62a.

63 and 64 designate two coils which are respectively slipped on the median poles 62 and 62a. The coils 63, 64 are intended to be directly fed with alternating current and are connected up so that the polarities that they determine on the median poles 62, 62a are opposed at a given time.

As will be observed from the foregoing description, when the compressor is out of action and consequently the magnets 11 and 12 are placed as shown in Fig. 3, the lines of force of the permanent polarisation field that they create closes across the two elements 57, 58 of the magnetic circuit, the lines of force passing at the same time by the median poles 62, 62a and the lateral poles 60, 61 and 60a, 61a.

When, on the other hand, the coils 63, 64 are fed with alternating current, for the first alternation of this current, the field produced closes, for example, by the median pole 62, the lateral pole 61, the magnet 12, the lateral pole 61a, the median pole 62a and the magnet 11.

As will be seen in this case, the magnets and hence, the thin plate 9 and the piston are displaced in the direction of the arrow $f_1$ (Fig. 3). The magnetic field passing through the magnets is directed in the same direction as that of these magnets, and hence, the latter run no risk of becoming demagnetized.

At the following alternation of the alternating current, the field produced closes by the median pole 62, the lateral pole 60, the magnet 11, the lateral pole 60a, the median pole 62a and the magnet 12. The two magnets are consequently moved in the opposite direction to that of the arrow $f_1$, but equally in the direction for which the lines of force coming from the alternating field are sent in the same direction as the lines of force coming from the polarisation constant field, and it follows that the magnets never run the risk of becoming demagnetized.

Another advantage of the arrangement described and of using polar parts 55 lies in the fact that in the case of an excess voltage of the feed current, more particularly when starting up, certain of the lines of force may pass through the polar parts without traversing the magnets which are thus protected even when their movement is delayed with regard to the alternations of the alternating current.

The invention is not restricted to the form of embodiment shown and described in detail, for various modifications can be applied to it without going outside its scope. In particular, it is possible to mount several compressors like those described above, in series, by possibly coupling them up to each other. This arrangement is particularly interesting, especially in the case of three-phase feed current networks, which enables three compressors of the kind described above to be mounted, for example, in a Y-connection.

I claim:

1. An electromagnetic motor for compressors or pumps, comprising a magnetic circuit provided with two symmetrical elements oppositely disposed in spaced relationship, each one of said symmetrical elements having three parallelly disposed and magnetically connected poles respectively provided with at least one alternating current winding, a reciprocable armature having two permanent magnets of opposite polarity inserted between the poles of said two symmetrical elements, a flexible member carrying said armature, and a bearing plate carrying said magnetic circuit and flexible member.

2. An electromagnetic motor for compressors or pumps, comprising a bearing member, a vibrating plate secured at one end to said bearing member, a magnetic armature secured at the other end of said vibrating plate, said magnetic armature having at least two permanent magnets parallelly disposed with respect to said vibrating blade, two magnetic circuits secured to said bearing member on both sides of said permanent magnets, said magnetic circuits each including a median pole element located between said permanent magnets when at rest and two lateral pole elements magnetically connected to the median pole and located on the outer sides of said permanent magnets, alternating current coil windings carried by said median pole elements, a compressing unit carried by said bearing member, and means connecting said vibrating blade to said compressing unit.

3. An electromagnetic motor for compressors or pumps, comprising an elastically suspended body having an open housing at its lower portion and an upper bent portion, a flexible plate secured to said upper bent portion and extending substantially parallel to said body, a supporting armature member of conductive material carried by said flexible plate at the lower portion thereof, said supporting member having a downwardly directed extension, a flexible rod secured to said extension, a flexible piston carried by said flexible rod, a cylinder for said piston secured to said body and closing said housing, a flexible distortable valve carried by said cylinder interposed between the latter and said housing, a magnetic circuit including two spaced oppositely disposed symmetrical elements carried by said body, each one of said symmetrical elements having three magnetically connected and parallelly disposed poles and at least one alternating current coil winding, and two permanent magnets of opposite polarity embedded in said supporting armature member and extending parallel to and between the poles of said two elements to oscillate when said coil windings are energized, said poles being spaced a distance corresponding substantially to the width of said permanent magnets so that the magnetic field of the latter closes through said poles magnetically connected together when said motor is at rest.

References Cited in the file of this patent

UNITED STATES PATENTS 2,605,042    Reutter _____ July 29, 1952

FOREIGN PATENTS 878,663    Germany _____ June 5, 1953
1,027,618    France _____ June 2, 1955